(12) United States Patent
Radu et al.

(10) Patent No.: US 12,386,958 B2
(45) Date of Patent: Aug. 12, 2025

(54) DERIVING STATISTICALLY PROBABLE AND STATISTICALLY RELEVANT INDICATOR OF COMPROMISE SIGNATURE FOR MATCHING ENGINES

(71) Applicant: CrowdStrike, Inc., Sunnyvale, CA (US)

(72) Inventors: Marian Radu, Jyväskylä (FI); Daniel Radu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 490 days.

(21) Appl. No.: 17/733,721

(22) Filed: Apr. 29, 2022

(65) Prior Publication Data
US 2023/0351016 A1 Nov. 2, 2023

(51) Int. Cl.
G06F 21/56 (2013.01)
G06F 21/55 (2013.01)
G06F 21/57 (2013.01)

(52) U.S. Cl.
CPC .......... G06F 21/565 (2013.01); G06F 21/552 (2013.01); G06F 21/563 (2013.01); G06F 21/577 (2013.01)

(58) Field of Classification Search
CPC .... G06F 21/565; G06F 21/552; G06F 21/563; G06F 21/577
See application file for complete search history.

(56) References Cited

U.S. PATENT DOCUMENTS 6,243,713 B1 * 6/2001 Nelson .................... G06F 16/40
704/235
2007/0233638 A1 * 10/2007 Carroll .................... G06F 16/28
(Continued)

FOREIGN PATENT DOCUMENTS

CN 114072798 A * 2/2022 ........... G06F 21/561
EP 3399464 A1 * 11/2018 ........... G06K 9/4652

OTHER PUBLICATIONS

L. Yang and J. Liu, "Tuning Malconv: Malware Detection With Not Just Raw Bytes," in IEEE Access, vol. 8, pp. 140915-140922, 2020, doi: 10.1109/ACCESS.2020 (Year: 2020).*

*Primary Examiner* — Huan V Doan
(74) *Attorney, Agent, or Firm* — Lee & Hayes, P.C.

(57) ABSTRACT

Methods and systems are provided for a histogram model configuring a computing system to derive an indicator of compromise signature based on a sliding window index of identified malware samples, and a matching rule constructor configuring a computing system to generate matching signatures by selecting statistically relevant n-grams of an unidentified file sample. A matching rule constructor configures the computing system to construct a matching rule including, as a signature, 32 n-grams found in the unidentified file sample which occur most frequently, and another 32 n-grams found in the unidentified file sample which occur least frequently amongst records of the threat database across 32 discrete file size ranges. These functions can configure backend operations to a sample identification operation performed by a user operating a client computing device, in a fashion that does not require a user to manually discern strings from the unidentified file sample to derive a signature for the matching engine to search against the threat database.

20 Claims, 5 Drawing Sheets

(56) References Cited

U.S. PATENT DOCUMENTS

| | | | |
|---|---|---|---|
| 2014/0297261 A1* | 10/2014 | Sayers | G06F 40/279 |
| | | | 704/9 |
| 2019/0018904 A1* | 1/2019 | Russell | G06F 16/9024 |
| 2020/0082083 A1* | 3/2020 | Choi | G06N 20/00 |
| 2021/0081477 A1* | 3/2021 | Tibbet | G06F 16/2465 |
| 2022/0245249 A1* | 8/2022 | Hewlett, II | G06F 21/566 |

* cited by examiner

DERIVING STATISTICALLY PROBABLE AND STATISTICALLY RELEVANT INDICATOR OF COMPROMISE SIGNATURE FOR MATCHING ENGINES

BACKGROUND

In computer security, the detection of malware is perennially a challenging problem, as malware is designed to evade known detection methods by eliminating, obfuscating, or concealing their identity as malware, rather than benign software. With every such evasive change in malware design, security experts must identify malware among unidentified file samples by comparing them to known samples of malware. Antivirus software and other such computer-executable applications may be installed on computing systems and programmed with computer-executable instructions to identify malware, so as to halt the execution of malware to prevent compromising of computing system functionality.

Security researchers may identify malware through manual inspection and comparison of malware samples to unidentified file samples, though such comparison is a high-cost endeavor due to levels of expertise required. Security services which provide rapid and adaptive recognition of malware are increasingly important, with the growth of malware which renders recovery of system functionality after infection greatly onerous or impossible. Thus, it is desirable to enable computing systems to identify malware amongst unidentified file samples more efficiently.

Security researchers, in manually inspecting unidentified file samples, tend to identify file samples by elements which are intuitively human-intelligible. For example, security researchers may discern that file samples commonly include certain human-intelligible character strings, and may therefore compare them to identified file samples for such character strings to determine whether the unidentified file samples are potentially malicious. At the same time, human inspection will tend to miss other patterns in unidentified file samples which are not human-intelligible; as a result, non-human-intelligible elements which are no less discriminating may become deemphasized in identification of malware.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
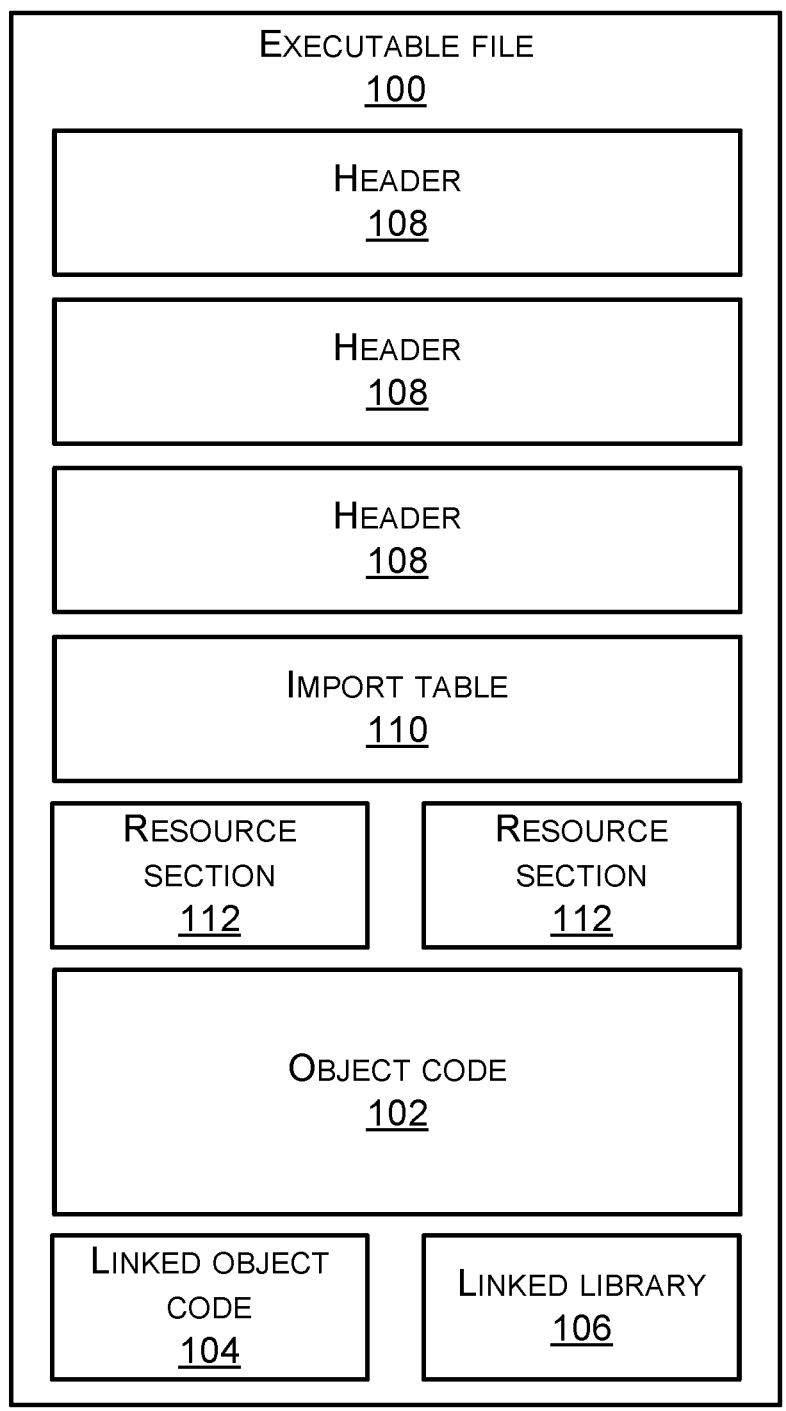
FIG. 1 illustrates a layout of an executable file according to examples of the present disclosure.

Systems and methods discussed herein are directed to implementing bytecode matching rules, and more specifically a histogram model configuring a computing system to derive an indicator of compromise signature based on a sliding window index of malware samples, and a matching rule constructor configuring a computing system to select matching signatures by selecting statistically relevant n-grams of an unidentified file sample.

In the routine course of business operations and day-to-day transactions, organizations and enterprises host various computing services for end users, organizational personnel, and other internal and external users on one or more networks. A network can be configured to host various computing infrastructures; computing resources; computer-executable applications; databases; computing platforms for deploying computer-executable applications, databases, and the like; application programming interface ("API") back-ends; virtual machines; and any other such computing service accessible by internal and external accessing the network from one or more client computing devices, external devices, and the like. Networks configured to host one or more of the above computing services may be characterized as private cloud services, such as data centers; public cloud services; and the like. Such networks may include physical hosts and/or virtual hosts, and such hosts may be located in a fashion collocated at premises of one or multiple organizations, distributed over disparate geographical locations, or a combination thereof.

A network can be configured by a network administrator over an infrastructure including network hosts and network devices in communication according to one or more network protocols. Outside the network, any number of client computing devices, external devices, and the like may connect to any host of the network in accordance with a network protocol. One or more networks according to examples of the present disclosure may include wired and wireless local area networks ("LANs") and such networks supported by IEEE 802 LAN standards. Network protocols according to examples of the present disclosure may include any protocol suitable for delivering data packets through one or more networks, such as, for example, packet-based and/or datagram-based protocols such as Internet Protocol ("IP"), Transmission Control Protocol ("TCP"), User Datagram Protocol ("UDP"), other types of protocols, and/or combinations thereof.

A network administrator can control access to the network by configuring a network domain encompassing computing hosts of the network and network devices of the network. For example, one or more private networks, such as an organizational intranet, can restrict access to client computing devices authenticated by security credentials of an organization, compared to one or more public networks such as the Internet.

Computing hosts of the network may be servers which provide computing resources for hosted frontends, back-ends, middleware, databases, applications, interfaces, web services, and the like. These computing resources may include, for example, computer-executable applications, databases, platforms, services, virtual machines, and the like. While any of these hosted elements are deployed and running over the network, one or more respective computing host(s) where the element is hosted may be described as undergoing uptime. While these hosted elements are not running and/or not available, the network and one or more respective computing host(s) where the element is hosted may be described as undergoing downtime.

Routine business operations and transactions of organizations and enterprises increasingly rely upon networks, computing hosts, and hosted services remaining free from disruptions in security and disruptions in uptime. Security and uptime can be compromised by one or more computing hosts of the network being configured by malware to execute malicious instructions, which can disrupt or damage computing resources or hosted services; induce downtime in computing resources or hosted services; breach security and/or access controls of one or more networks; allow arbitrary computer-executable instructions to run on one or more computing hosts; and so on.

Network administrators, cybersecurity researchers, and such personnel of an organization will routinely encounter malware infections, and attempted malware infections, occurring at one or more networks of an organization or enterprise. Network administrators, cybersecurity researchers, and such personnel of an organization can, furthermore, store samples of computer-executable instructions taken from each malware infection, and each attempted malware infection, in records of a threat database.

Across the field of cybersecurity, as well as across a broad range of organizations and enterprises in many different fields, a "threat database" should be generally understood as including sampled computer-readable representations (as shall be described subsequently) of object code of computer-executable files which configure computing systems to perform malicious operations to infect, damage, hijack, destabilize, or otherwise harm normal functioning of the computing system.

Due to the unpredictable, ad-hoc, and idiosyncratic natures of malware infections, it is often challenging for network administrators, cybersecurity researchers, and such personnel of an organization to determine whether an unidentified file sample is malware, is a benign file concealing malware, or otherwise contains computer-executable instructions which configure computing systems to perform malicious operations to infect, damage, hijack, destabilize, or otherwise harm normal functioning of the computing system. Organizations and enterprises can collect a diverse range of malware samples in threat databases, enabling network administrators, cybersecurity researchers, and such personnel of an organization to derive malware elements which can be matched against unidentified file samples to preventatively detect malware.

However, different organizations and enterprises will respectively acquire threat databases which are vastly different in content, and disparate in coverage of heterogeneous malware samples. Consequently, each individual organization and enterprise may acquire only a limited selection of malware samples, and each individual organization and enterprise is only able to derive a limited set of malware elements to match against unidentified file samples. Organizations and enterprises become capable of detecting more incidences of malware infections when in possession of more diverse threat databases, leading to deriving larger sets of malware elements which can potentially match against more unidentified file samples.

Therefore, organizations and enterprises seek to exchange and share information across individual threat databases, allowing each organization and enterprise to expand its capability for identifying incidences of malware. It is not practical to directly share data records from threat databases, since different organizations and enterprises can maintain threat databases in mutually incompatible formats, preventing data records from one threat database from being parsed or stored in another. Consequently, organizations and enterprises interested in mutually expanding their capacities for detecting malware have developed signature-based detection techniques.

By way of example, a variety of organizations and enterprises have adopted the open-source YARA tool, providing a matching engine which configures a computing system to scan an executable file against any number of matching rules.

A matching engine, such as a YARA engine, can run on a computing system as a backend to any cybersecurity analytics tools, system and/or network monitoring tools, or any other computer-executable tools which configure a computing system operated by network administrators, cybersecurity researchers, and such personnel of an organization who may investigate malware threats to computing systems and/or networks in real time, prospectively, or retrospectively. A matching engine can configure a computing system to search a threat database, which can be locally stored on storage of a common computing system or can be remotely stored on storage of any number of networked computing hosts. Moreover, according to examples of the present disclosure, a threat database and a matching engine can be hosted on one or more computing hosts as a hosted application provided to network administrators, cybersecurity researchers, and such personnel of an organization.

A matching engine allows network administrators, cybersecurity researchers, and other such personnel of an organization to describe, using a syntactical structured markup language, one or more patterns which should occur in object code of an executable file. Such patterns can be described as "signatures," and each matching rule signature can contain one or more text strings; can contain one or more hexadecimal strings; and can otherwise contain one or more sequences of characters which can occur in bytecode of executable files.

By way of example, FIG. 1 illustrates a layout of an executable file 100 according to examples of the present disclosure. An executable file 100 may include, for example, object code 102 compiled to the Portable Executable ("PE") format executable on computing systems running, for example, Windows operating systems from Microsoft Corporation of Redmond, Washington; object code compiled to the Mach object ("Mach-O") format executable on computing systems running, for example, MacOS or iOS operating systems from Apple Inc. of Cupertino, California; object code compiled to the Executable and Linkable Format ("ELF") executable on computing systems running, for example, open-source Linux operating systems or Android operating systems; and the like.

However, it should be understood that malicious examples of executable files can be obfuscated in manners that disguise their actual format. Therefore, even though object code 102 can be compiled to one of these formats executable on certain computing systems, the object code 102 according to examples of the present disclosure may be embedded, injected, or otherwise presented as any other arbitrary format of file, such as image files, audio files, document files, and the like, while remaining computer-executable in nature.

The object code 102 may be further statically or dynamically linked to additional object code 104 and/or libraries 106, which may contain functions, routines, objects, variables, and other source code which may be called in source code, the calls being resolved by a compiler during compilation of the source code to create linked object code which may be executed by a computer as part of the executable file 100.

Additionally, an executable file 100 may include some number of headers 108 which occupy sequences of bytes preceding compiled object code 102 and/or linked object code 104 and/or linked libraries 106; following compiled object code 102 and/or linked object code 104 and/or linked libraries 106; and/or interleaved between compiled object code 102 and/or linked object code 104 and/or linked libraries 106. Executable file formats may define different types of headers 108, as well as sub-headers thereof, containing various sequences of data which may be referenced by object code 102, may be referenced during execution of the executable file 100 at runtime, and so on.

For example, executable file formats may define one or more executable file format-defining headers. Generally, different formats of executable files may define different headers whose inclusion in an executable file define that file as belonging to that respective format. For example, executable files of the PE format may define a Disk Operating System ("DOS") executable header, a PE header, as well as an optional header (it should be understood that optional headers are called "optional" by naming conventions, and are not necessarily optional for the purpose of understanding examples of the present disclosure). Executable files of the Mach-O format may define a Mach-O header. ELF executable files may define an ELF header.

Additionally, executable file formats may define one or more import tables 110. An import table 110 may resolve references in the object code which link one or more libraries providing functions, routines, objects, variables, and other source code which may be linked to the executable file during compilation or at runtime.

Additionally, executable file formats may include resource sections 112. For example, executable files of the PE Format may include file icon images, image files in general, dialog boxes, and the like. These resources may be stored in one or more discrete sections of the executable file 100.

It should be understood that, while object code 104 of an executable file 100 is generated by source code compilers in a computer-executable format, the object code 104 can also be represented in a computer-readable but non-computer-executable format, including as a sequence of ASCII values, and as a sequence of hexadecimal values. Object code 104 of an executable file 100, represented as ASCII values and/or hexadecimal values rather than represented in binary form, can be read by a computing system while being in a non-computer-executable representation. Furthermore, various executable files which have been determined to be malware can be stored in non-computer-executable representations as one or more records of a threat database in storage of a computing system. In this manner, object code of the executable files can be rendered incapable of execution and incapable of configuring a computing system to perform malicious operations, thereby quarantining the executable files to some extent while leaving them available for scanning by a matching engine as described above.

For example, a computer-readable representation of any given file, including one or more executable files can generally be described as a binary large object ("BLOB"). A BLOB is generally any arbitrarily large data file which can include a computer-readable representation of any arbitrary file format, including representations of object code and other contents of executable files. In a threat database according to examples of the present disclosure, a data record can include, in at least one field, a BLOB representing object code of one or more executable files. It should be understood that, although a "BLOB" does not necessarily follow any standard implementation, a BLOB according to examples of the present disclosure should at least represent object code of an executable file in a non-computer-executable format, such as in the form of a sequence of ASCII values or as a sequence of hexadecimal values rather than binary form, as mentioned above.

For brevity, subsequently, any such non-computer-executable representation, whether stored in a record of a threat database or otherwise stored on a computing system, shall be referred to as a "sample."

According to examples of the present disclosure, a matching engine can further configure a computing system to read into memory one or more matching rules defined by a signature of text strings or a signature of hexadecimal strings; to search records of a threat database using the one or more matching rules as a search parameter, causing any number of records of the threat database to be matched, where those records include identified file samples which match at least one of the one or more matching rules; and to return the matched records of the threat database.

Furthermore, according to examples of the present disclosure, a matching engine can configure a computing system to index identified file samples of the threat database. In order to configure computing systems to efficiently search records of a database, a computing system can tokenize n-grams (i.e., arbitrarily taking contiguous sequences of n bytes from a longer sequence, without regard as to the content of the n-gram or the content of the longer sequence) from a record, storing the n-grams in an index. The matching engine can then configure the computing system to read a matching rule into memory, and look up each string of the matching rule in the index to determine any number of records which match the string. In this manner, the matching engine can match signatures against records more efficiently than traversing each record.

A matching engine can configure a computing system to index identified file samples of the threat database using a sliding window index. A computing system can be configured to build a sliding window index by tokenizing n-grams at intervals of bytes over a stream of data, such as a computer-readable representation of object code of an executable file. Thus, a computing system according to examples of the present disclosure can be configured to tokenize n-grams, for any value of n bytes, over an interval of any value across a computer-readable representation of object code of an executable file. Furthermore, the interval can be smaller than the value of n, such that each tokenized n-gram overlaps in part with prior and subsequent n-grams. Different parameter values including the value of n and the size of the interval can change the behavior of the computing system indexing samples of the threat database.

According to database indexing techniques, the matching engine can configure a computing system to index identified file samples according to various parameter values to optimize efficiency of searching records of the threat database. However, according to examples of the present disclosure, the matching engine can alternatively and/or additionally configure a computing system to index identified file samples according to parameter values that can improve performance of a histogram model and a matching rule constructor according to examples of the present disclosure as shall subsequently be described.

According to examples of the present disclosure, a text signature and a hexadecimal signature, where either can be subsequently referred to as a "signature," respectively refer to any collection of text strings or any collection of hexadecimal strings included in a matching rule. It should be understood that any such text string could appear anywhere in a sequence of ASCII values representing object code of an executable file, or could fail to appear therein; likewise, any such hexadecimal string could appear anywhere in a sequence of hexadecimal values representing object code of an executable file, or could fail to appear therein. In the event that, among a collection of such strings, each one appears in a same identified file sample, there is a high probability that the signature and the identified file sample therefore represent the same file or substantially the same file.

Therefore, network administrators, cybersecurity researchers, and such personnel of an organization can define a signature including some number of text strings and/or hexadecimal strings derived from object code of unidentified file samples, and a matching engine can configure a computing system to match such a signature, derived from an unidentified file sample of any arbitrary file format, against identified file samples, returning results that allow a determination that the unidentified file sample represent the same or substantially the same malware as an identified file sample, even if the unidentified file sample was obfuscated against identification.

Such signatures should include a selection of strings which comparatively uniquely identify the unidentified file sample they originate from, without overly uniquely identifying the unidentified file sample. A signature which fails to uniquely identify its originating file sample may be overly generic, resulting in false positive matches against identified file samples which are, in reality, unrelated. A signature which overly uniquely identifies its originating file sample may be overly unique, resulting in false negative matches in the event that portions of the signature are derived from obfuscated portions of the originating file sample which do not pertain to its malicious function, and merely serve to prevent the file sample from being matched against identified malware.

A collection of text or hexadecimal strings included in a signature can be derived from manual inspection of any file sample, wherein network administrators, cybersecurity researchers, and such personnel of an organization review text or hexadecimal representations of object code of an unidentified file sample; discern strings exhibiting patterns, unique sequences, unusual content, and the like; and collect such strings as part of a signature. However, such manual derivation of signatures is limited by the fact that human reviewers tend to pay attention to human-intelligible strings, such as strings containing intelligible words or strings containing distinct patterns. In contrast, non-human-intelligible strings, such as strings containing no words and no patterns, can be just as effective, or can be even more effective, as human-intelligible strings for matching against identified file samples.

It is not practical to train network administrators, cybersecurity researchers, and other such personnel of an organization to manually discern non-human-intelligible strings from unidentified file samples, since humans are not well-equipped to determine whether any non-human-intelligible string can be commonly found in a variety of files or will selectively occur among malware samples. Therefore, examples of the present disclosure provide a histogram model configuring a computing system to derive an indicator of compromise signature based on a sliding window index of identified malware samples, and a matching rule constructor configuring a computing system to generate matching signatures by selecting statistically relevant n-grams of an unidentified file sample.

Figure 2:
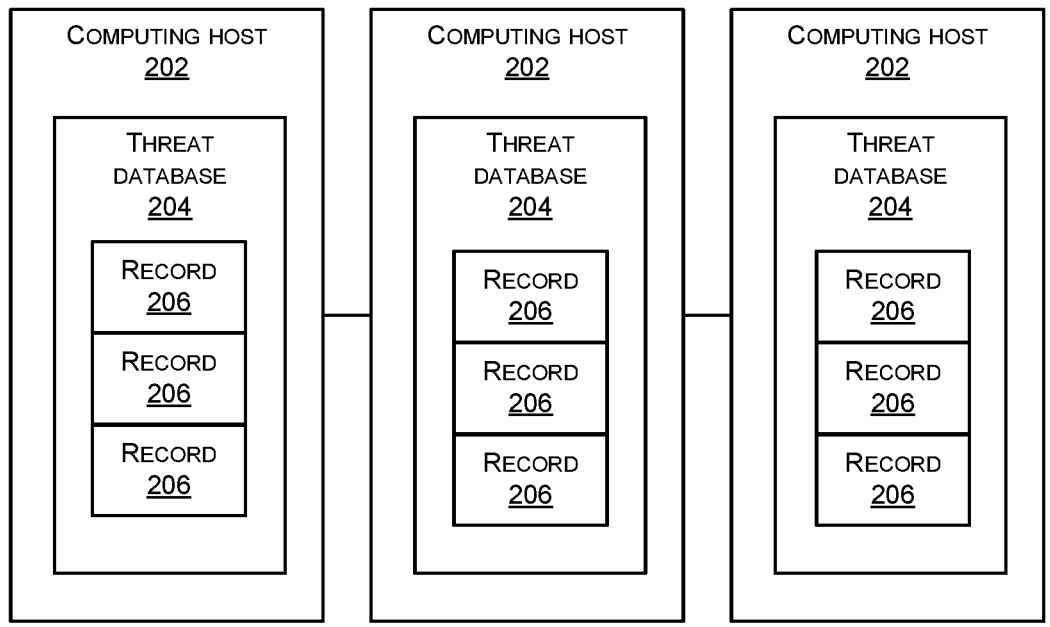
FIG. 2 illustrates a schematic diagram of a threat database hosting network according to examples of the present disclosure.

FIG. 2 illustrates a schematic diagram of a threat database hosting network 200 according to examples of the present disclosure. Computing hosts 202 may include any networked computing systems, and some number of computing hosts 202 may host computing resources; any number among the computing hosts 202 may individually or collectively host a threat database 204 accessible by some number of other computing hosts over a private network.

The data records of the threat database 204 may be stored and updated across the networked computing hosts 202 in an architecturally centralized or decentralized, single-copy or distributed, strongly consistent or weakly consistent, duplicated or replicated fashion, and may generally be stored according to any suitable database architecture known to persons skilled in the art.

According to examples of the present disclosure, a threat database can include records 206, each record 206 including a computer-readable representation of object code of a computer-executable file as described above, as well as any number of fields which identify the computer-executable file as malware and provide additional identifying and contextual information regarding the malware, such as filenames, dates and times when malware instances were identified, pathways by which the malware infects computing systems, and the like. Malware can include any samples of executable files which are executable by computing systems to perform particular malicious operations to infect, damage, hijack, destabilize, or otherwise harm normal functioning of the computing system by a similar pathway.

As described above, an executable file may include, for example, object code compiled to the PE format, object code compiled to the Mach-O format, object code compiled to ELF, and the like. The object code may be further statically or dynamically linked to additional object code and/or libraries. Additionally, an executable file may include some number of headers, such as one or more executable file format-defining headers. Additionally, executable file formats may define one or more import tables. Additionally, executable file formats may include resource sections.

Figure 3:
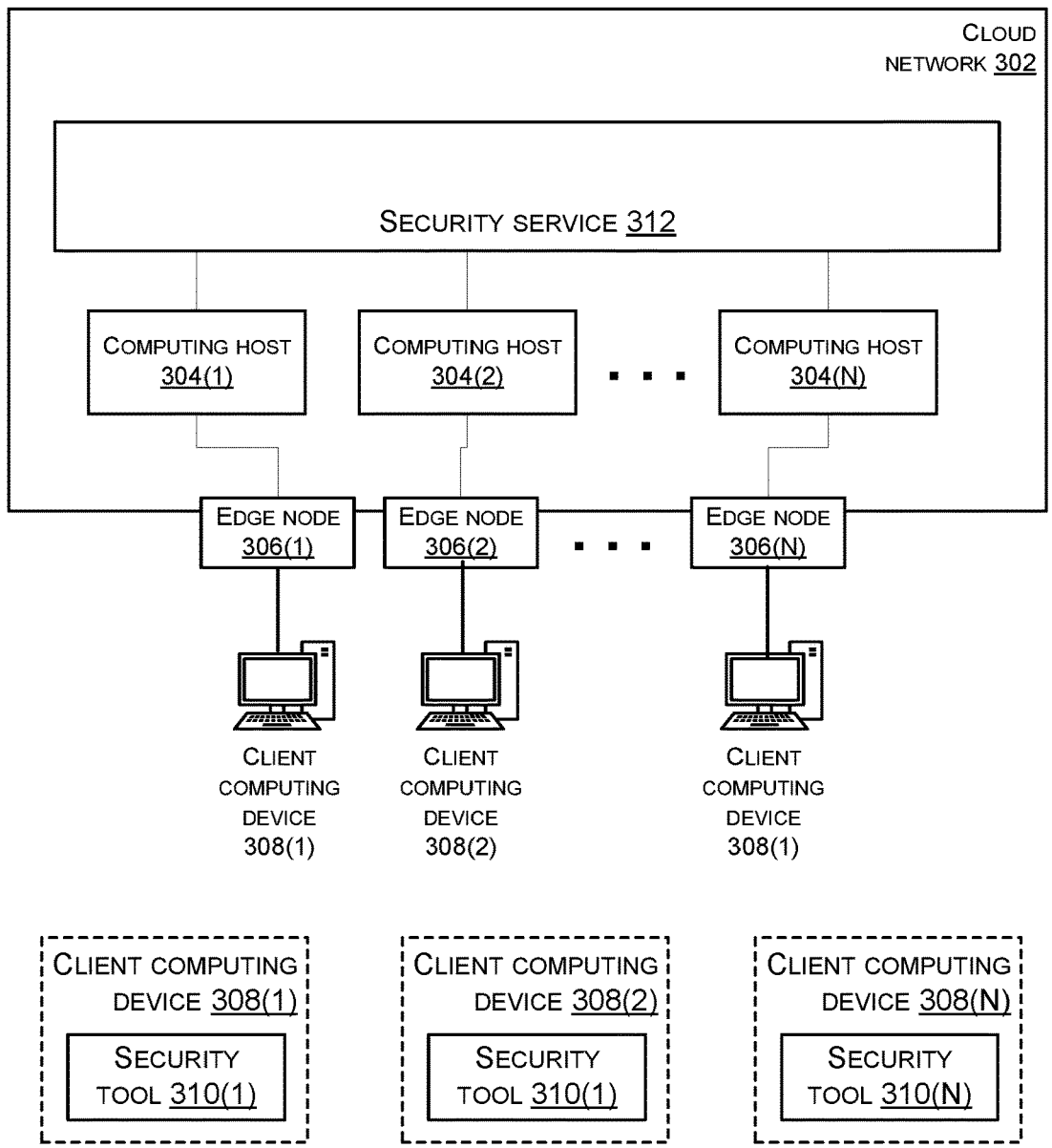
FIG. 3 illustrates an architectural diagram of a cloud computing system according to examples of the present disclosure.

FIG. 3 illustrates an architectural diagram of a cloud computing system 300 according to examples of the present disclosure. The cloud computing system 300 may be implemented over a cloud network 302 of physical or virtual computing hosts 304(1), 304(2), . . . , 304(N) (where any unspecified computing host may be referred to as a computing host 304) connected by physical or virtual network connections. Furthermore, the cloud network 302 terminates at physical or virtual edge nodes 306(1), 306(2), . . . , 306(N) (where any unspecified edge node may be referred to as an edge node 306) located at physical and/or logical edges of the cloud network 302. The edge nodes 306(1) to 306(N) may connect to any number of client computing devices 308(1), 308(2), . . . , 308(N) (where any unspecified client computing devices may be referred to as a client computing devices 308). A client computing device 308, such as, by way of example, client computing device 308(1), may run one or more instances of various security tools 310(1), 310(2), . . . , 310(N) (where any unspecified security tool instance may be referred to as a security tool 310).

Security tools 310 may be, generally, computer-executable applications which enable, when executed by a client computing device 308, the client computing device 308 to communicate with a security service 312 over the cloud network 302 to access a variety of hosted applications provided by the security service 312 to users of the client computing device 308. Users of the client computing device 308 may operate a frontend provided by the respective security tool 310 running on the client computing device 308 so as to access the hosted applications of the security service 312 over one or more network connections.

For example, security tools 310 can include various analytics tools for investigating unidentified file samples of any arbitrary file format collected from compromised computing systems and/or networks, system and/or network monitoring tools that monitor computing systems and/or networks for intrusions and infection in real time, incident reporting tools that receive reports of intrusions or infection, or potential intrusions or infection, from organizational personnel, and the like, without limitation; different client computing devices 308 can run different such security tools 310 or multiple such security tools. Functions of security tools 310 can include, for example, blocking security holes and security exploits; filtering inbound and outbound connections; policy enforcement; scanning and analysis of data and computer-executable files; and the like. Such functions can be performed at least in part by hosted applications providing backend functionality.

Hosted applications of a security service 312 may be performed by one or more physical or virtual processor(s) of the cloud computing system 300 in response to operations performed by, or operations performed by an end user through, a security tool 310 running on any of the client computing devices 308 by the exchange of data and communication between the client computing devices 308 and the security service 312 over the cloud network 302.

Hosted applications of a security service 312 can include a matching engine which configures one or more computing hosts 304 to search a threat database 206 as described above. The threat database 206 can be hosted on one or more hosts of the cloud computing system 300, or can be hosted on one or more hosts of a threat database hosting network 200 separate from the cloud computing system 200. Any number of client computing devices 308 operated by users possessing security credentials of the cloud network 302 may, by running a set of computer-executable instructions which configure the client computing devices to run a user-operable frontend (which can be part of a security tool 310 as described above), connect to the networked computing hosts (such as by one or more connections over one or more private networks as mentioned above), and send a search request to the matching engine to request one or more searches of the threat database 206 based on one or more signatures as described above.

According to examples of the present disclosure, such a search request can be a backend operation to a sample identification operation performed by a user operating a client computing device 308. A user operating a client computing device 308 can be a network administrator, cybersecurity researcher, and such personnel of an organization. The client computing device 308 can be configured by a running security tool 310 to enable a user to investigate an unidentified file sample of any arbitrary file format, and search for the unidentified file sample in the threat database 206.

Unidentified file samples can originate from the security service 312, including one or more hosted applications thereof, which provide backend functionality to security tools 310. One or more hosted applications may configure one or more computing hosts 304 to isolate an unidentified computer-executable file during a malware infection or attempted malware infection of one or more computing systems and/or networks; to detect an unidentified computer-executable file by real-time monitoring of computing systems and/or networks for intrusions and infection; receive an unidentified computer-executable file from a report of intrusions or infection, or potential intrusions or infection, from organizational personnel; and the like. One or more hosted applications can further configure one or more computing hosts 304 to store the unidentified computer-executable file as a computer-readable sample, as described above.

According to examples of the present disclosure, rather than requiring a user to manually discern strings from the unidentified file sample to derive a signature for the matching engine to search against the threat database 206, one or more hosted applications of the security services 312 can further provide a histogram model and a matching rule constructor.

A histogram model, according to examples of the present disclosure, may include a set of computer-executable instructions that configure one or more processors of a computing system to take, as input, any tokenized n-gram, and a set of records of a threat database matched against the n-gram by a matching engine, and output a histogram in which counts of records matched against the n-gram are counted across discrete bins according to file size. For example, the histogram can be a 32-bin histogram according to examples of the present disclosure.

According to examples of the present disclosure, to generate tokenized n-grams as input for the histogram model, one or more hosted applications of the security services 312 can further provide a sample tokenizer (i.e., a set of instructions configuring a computing system to arbitrarily take contiguous sequences of n bytes from a longer sequence, without regard as to the content of the n-gram or the content of the longer sequence). The sample tokenizer can provide backend functionality to security tools 310 by tokenizing an unidentified file sample in the course of a user investigating an unidentified file sample.

The sample tokenizer can configure a computing system to tokenize an unidentified file sample (which can be represented as text or as hexadecimal, as described above) according to various parameter values for a value of n and a size of the interval as described above with respect to sliding window indexing. By way of example, the value of n can be 4 and the size of the interval can be 1, such that the sample tokenizer configures a computing system to tokenize, at every byte of the unidentified file sample, every 4-gram of the unidentified file sample. In other words, the computing system is configured to tokenize every contiguous sequence of 4 bytes from the unidentified file sample as a different n-gram. By way of another example, if the size of the interval is 2 instead of 1, the computing system is configured to tokenize every other contiguous sequence of 4 bytes from the unidentified file sample as a different n-gram. Subsequently, "n-gram" shall be used without limitation as to the particular value of n.

It should be understood that the sample tokenizer can configure a computing system to tokenize an unidentified file sample according to other values of n and other sizes of the interval, without limitation. Larger intervals can configure a computing system to perform fewer tokenizations, reducing computational complexity, but reducing granularity of the indicator of compromise matching rule (as shall be subsequently described).

The matching engine can configure a computing system to match each tokenized n-gram against records of the threat database 206, returning each matched record, in manners as described above.

The histogram model can thus configure a computing system to take each tokenized n-gram, and the set of matched records corresponding to that n-gram, as input to output a histogram. The computing system can be configured to establish some number of bins (such as, by way of example, 32 bins) which discretize a range of identified file samples from the set of matched records. For example, different bins may discretize identified file samples each by a mutually exclusive subrange of file sizes. The computing system can further be configured to count the number of identified file samples occurring for each subrange of file sizes. The computing system can further be configured to repeat the above for each tokenized n-gram, thus deriving one histogram for each tokenized n-gram.

It should be understood that for each histogram, the computing system is configured to derive a count corresponding to each discrete bin for a histogram aggregator (as described subsequently), but does not need to generate a visualization of the histogram over its multiple bins.

According to examples of the present disclosure, one or more hosted applications of the security services 312 can further provide a histogram aggregator.

A histogram aggregator, according to examples of the present disclosure, may include a set of computer-executable instructions that configure one or more processors of a computing system to take, as input, any number of histograms corresponding to respective n-grams, and aggregate each histogram into an aggregated histogram. Thus, for each bin of the aggregated histogram, the computing system can compare counts (of matching records) for each respective n-gram in that bin. The computing system can determine a most frequent n-gram for counts in each respective bin and can determine a least frequent n-gram for counts in each respective bin.

According to examples of the present disclosure, one or more hosted applications of the security services 312 can further provide a matching rule constructor.

A matching rule constructor, according to examples of the present disclosure, may include a set of computer-executable instructions that configure one or more processors of a computing system to take, as input, a signature including at least a most frequent n-gram for counts in each respective bin of an aggregated histogram, and construct a matching rule according to the most frequent n-grams of the signature. By way of example, for a 32-bin aggregated histogram, the matching rule constructed in this fashion will include, as a signature, 32 n-grams found in the unidentified file sample which occur most frequently amongst records of the threat database across 32 discrete file size ranges. According to examples of the present disclosure, such a matching rule is subsequently referred to as a most statistically probable matching rule.

Furthermore, the computing system can be configured to additionally take, as input, a signature including at least a least frequent n-gram for counts in each respective bin of an aggregated histogram, and construct a matching rule according to the most frequent n-grams and the least frequent n-grams of the signature. By way of example, for a 32-bin aggregated histogram, the matching rule constructed in this fashion will include, as a signature, 32 n-grams found in the unidentified file sample which occur most frequently amongst records of the threat database across 32 discrete file size ranges, and another 32 n-grams found in the unidentified file sample which occur least frequently amongst records of the threat database across 32 discrete file size ranges. According to examples of the present disclosure, such a matching rule is subsequently referred to as a most statistically relevant matching rule, as it includes not only most statistically probable n-grams but also least statistically probable n-grams.

According to examples of the present disclosure, a most statistically probable matching rule and a most statistically relevant matching rule as described above both include at least those n-grams of an unidentified file sample which occur most frequently across samples of discrete ranges of file sizes. These most statistically probable n-grams are expected to match identified file samples on a comparatively generic basis, and thus can be appropriately uniquely identifying for unidentified file samples which are smaller in size, which may not yield sufficient tokenized n-grams to successfully match against identified file samples.

According to examples of the present disclosure, a most statistically relevant matching rule as described above further includes those n-grams of an unidentified file sample which occur least frequently across samples of discrete ranges of file sizes. In combination with those n-grams which occur most frequently, these most statistically relevant n-grams are expected to match identified file samples on a comparatively less generic basis, and thus can be appropriately uniquely identifying for unidentified file samples which are larger in size, which may yield too many tokenized n-grams which would successfully match against identified file samples. Adding the least frequently occurring n-grams therefore filters out false positives.

For the aggregated histogram to be sufficiently granular in yielding matching rules as described herein, the sample tokenizer can configure a sufficiently small interval so as to derive more n-grams, and the threat database can include a selection of identified file samples which is large and as heterogeneous in origin and file format.

Subsequently, the matching engine can further configure a computing system to read into memory a most statistically probable matching rule or a most statistically relevant matching rule constructed as described above; to search records of a threat database using the most statistically probable matching rule or the most statistically relevant matching rule as a search parameter, causing any number of records of the threat database to be matched, where those records include identified file samples which match at least one of the one or more matching rules; and to return the matched records of the threat database. Thus, the above-mentioned hosted applications of a security service 312 provide backend operation to a sample identification operation performed by a user operating a client computing device 308, in a fashion that does not require a user to manually discern strings from the unidentified file sample to derive a signature for the matching engine to search against the threat database 206.

After network administrators, cybersecurity researchers, and such personnel of one organization have derived a most statistically probable matching rule or a most statistically relevant matching rule from that organization's proprietary threat database, they can share that most statistically probable matching rule or most statistically relevant matching rule with other organizations. The shared matching rules therefore can distill insights derived from a selection of identified file samples which is large and as heterogeneous in origin and file format, while remaining sharable without conflicting with proprietary schema of other threat databases. The shared matching rules can be applied to recipient organizations' threat databases using standardized matching engines such as YARA engines, so that those recipient organizations can benefit from insights derived from each other's malware collections.

Figure 4:
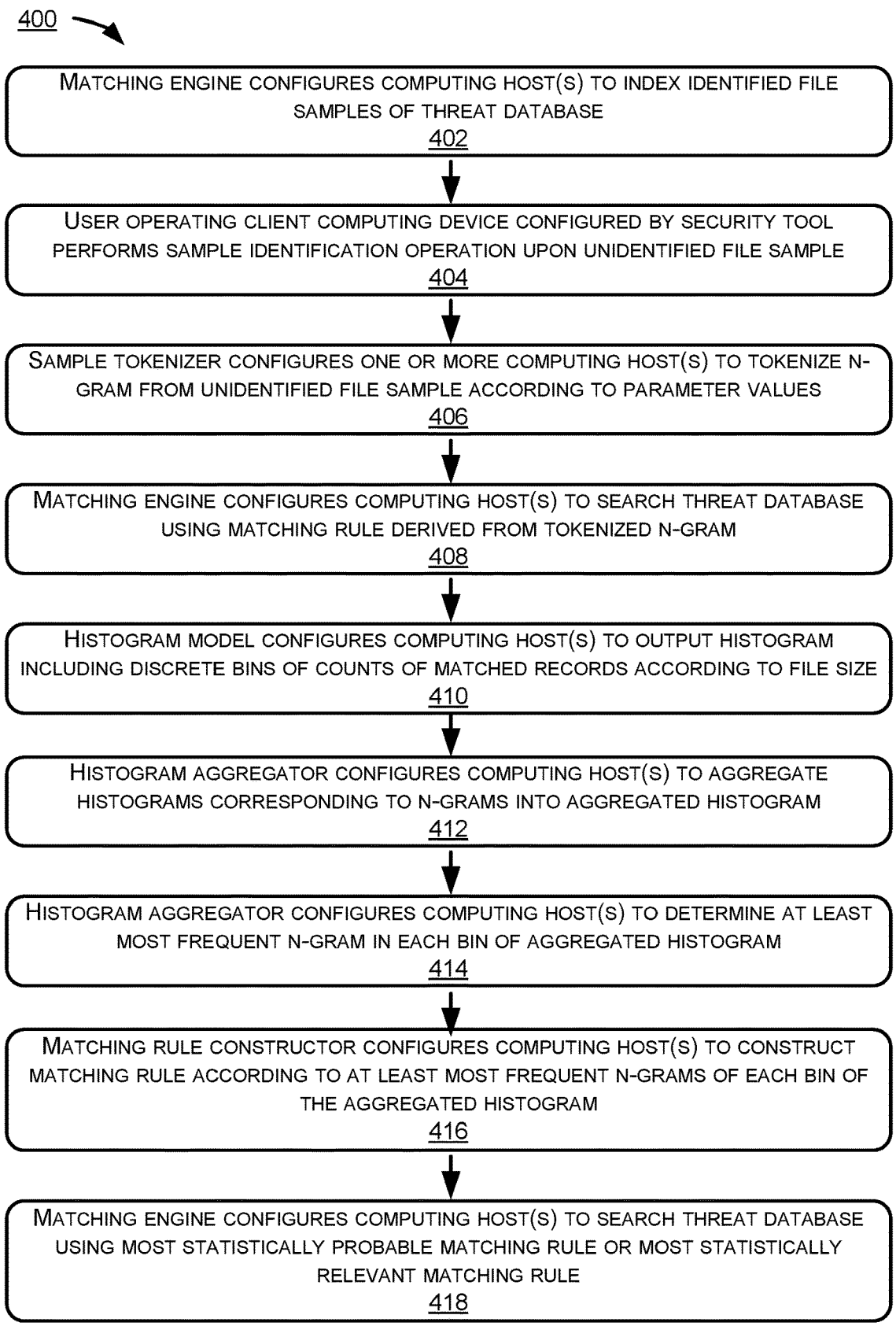
FIG. 4 illustrates a flowchart of a matching rule construction method according to examples of the present disclosure.

FIG. 4 illustrates a flowchart of a matching rule construction method 400 according to examples of the present disclosure.

In step 402 of the matching rule construction method 400, a matching engine configures one or more computing hosts to index identified file samples of a threat database.

The threat database can be hosted on one or more hosts of a cloud computing system, or can be hosted on one or more hosts of a threat database hosting network separate from the cloud computing system. Any number of client computing devices operated by users possessing security credentials of the cloud network may, by running a set of computer-executable instructions which configure the client computing devices to run a user-operable frontend (which can be part of a security tool), connect to the networked computing hosts (such as by one or more connections over one or more private networks), and send a search request to the matching engine to request one or more searches of the threat database based on one or more signatures.

According to examples of the present disclosure, such a search request can be a backend operation to a sample identification operation performed by a user operating a client computing device. A user operating a client computing device can be a network administrator, cybersecurity researcher, and such personnel of an organization. The client computing device can be configured by a running security tool to enable a user to investigate an unidentified file sample of any arbitrary file format, and search for the unidentified file sample in the threat database.

In order to configure computing systems to efficiently search records of a database, a computing system can tokenize n-grams (i.e., contiguous sequences of n bytes) from a record, storing the n-grams in an index. The matching engine can then configure the computing system to read a matching rule into memory, and look up each string of the matching rule in the index to determine any number of records which match the string. In this manner, the matching engine can match signatures against records more efficiently than traversing each record.

A matching engine can configure a computing system to index identified file samples of the threat database using a sliding window index. A computing system can be configured to build a sliding window index by tokenizing n-grams at intervals of bytes over a stream of data, such as a computer-readable representation of object code of an executable file. Thus, a computing system according to examples of the present disclosure can be configured to tokenize n-grams, for any value of n bytes, over an interval of any value across a computer-readable representation of object code of an executable file. Furthermore, the interval can be smaller than the value of n, such that each tokenized n-gram overlaps in part with prior and subsequent n-grams. Different parameter values including the value of n and the size of the interval can change the behavior of the computing system indexing samples of the threat database.

It should be understood that step 402 can be performed at any time before step 404, without limitation as to proximity or distance in time. Moreover, step 402 can be performed any number of times as the threat database grows and new records are stored therein.

In step 404 of the matching rule construction method 400, a user operating a client computing device configured by a security tool performs a sample identification operation upon an unidentified file sample.

A user operating a client computing device can be a network administrator, cybersecurity researcher, and such personnel of an organization. The client computing device can be configured by a running security tool to enable a user to investigate an unidentified file sample of any arbitrary file format, and search for the unidentified file sample in a threat database.

Security tools may be, generally, computer-executable applications which enable, when executed by a client computing device, the client computing device to communicate with a security service over a cloud network to access a variety of hosted applications provided by the security service to users of the client computing device. Users of the client computing device may operate a frontend provided by the respective security tool running on the client computing device so as to access the hosted applications of the security service over one or more network connections.

For example, security tools can include various analytics tools for investigating unidentified file samples of any arbitrary file format collected from compromised computing systems and/or networks, system and/or network monitoring tools that monitor computing systems and/or networks for intrusions and infection in real time, incident reporting tools that receive reports of intrusions or infection, or potential intrusions or infection, from organizational personnel, and the like, without limitation; different client computing devices can run different such security tools or multiple such security tools. Functions of security tools can include, for example, blocking security holes and security exploits; filtering inbound and outbound connections; policy enforcement; scanning and analysis of data and computer-executable files; and the like. Such functions can be performed at least in part by hosted applications providing backend functionality.

Hosted applications of a security service may be performed by one or more physical or virtual processor(s) of the cloud computing system in response to operations performed by, or operations performed by an end user through, a security tool running on any of the client computing devices by the exchange of data and communication between the client computing devices and the security service over the cloud network 302.

Unidentified file samples can originate from the security service, including one or more hosted applications thereof, which provide backend functionality to security tools. One or more hosted applications may configure one or more computing hosts to isolate an unidentified computer-executable file during a malware infection or attempted malware infection of one or more computing systems and/or networks; to detect an unidentified computer-executable file by real-time monitoring of computing systems and/or networks for intrusions and infection; receive an unidentified computer-executable file from a report of intrusions or infection, or potential intrusions or infection, from organizational personnel; and the like. One or more hosted applications can further configure one or more computing hosts to store the unidentified computer-executable file as a computer-readable sample, as described above.

According to examples of the present disclosure, rather than requiring a user to manually discern strings from the unidentified file sample to derive a signature for the matching engine to search against the threat database, one or more hosted applications of the security services can further provide a histogram model and a matching rule constructor.

In step 406 of the matching rule construction method 400, a sample tokenizer configures one or more computing hosts to tokenize an n-gram from the unidentified file sample according to parameter values for a value of n and a size of an interval.

The unidentified file sample can be represented as text or as hexadecimal. Parameter values for a value of n and a size of the interval can vary as described herein with respect to sliding window indexing.

The sample tokenizer can provide backend functionality to security tools by tokenizing an unidentified file sample in the course of a user investigating an unidentified file sample.

By way of example, the value of n can be 4 and the size of the interval can be 1, such that the sample tokenizer configures a computing system to tokenize, at every byte of the unidentified file sample, every 4-gram of the unidentified file sample. In other words, the computing system is configured to tokenize every contiguous sequence of 4 bytes from the unidentified file sample as a different n-gram. By way of another example, if the size of the interval is 2 instead of 1, the computing system is configured to tokenize every other contiguous sequence of 4 bytes from the unidentified file sample as a different n-gram.

It should be understood that the sample tokenizer can configure a computing system to tokenize an unidentified file sample according to other values of n and other sizes of the interval, without limitation. Larger intervals can configure a computing system to perform fewer tokenizations, reducing computational complexity, but reducing granularity of the indicator of compromise matching rule.

It should be understood that step 406 can be performed any number of times, while distinct n-grams to be tokenized from the unidentified file sample still remain based on the size of the interval relative to the size of an unidentified file sample. It should further be understood that step 408 below can proceed after step 406 has been performed any number of times, and one or more computing systems can perform step 408 at least in part concurrently to one or more same or different computing systems performing step 406.

In step 408 of the matching rule construction method 400, a matching engine configures one or more computing hosts to search a threat database using a matching rule derived from a tokenized n-gram, returning a set of matched records.

Hosted applications of a security service can include a matching engine which configures one or more computing hosts to search a threat database. A matching engine can configure a computing system to read into memory one or more matching rules defined by a signature of text strings or a signature of hexadecimal strings; to search records of a threat database using the one or more matching rules as a search parameter, causing any number of records of the threat database to be matched, where those records include identified file samples which match at least one of the one or more matching rules; and to return the matched records of the threat database.

It should be understood that step 408 can be performed any number of times, at least once for each of the tokenized n-grams from step 406. It should further be understood that step 410 below can proceed after step 408 has been performed any number of times, and one or more computing systems can perform step 410 at least in part concurrently to one or more same or different computing systems performing step 408 as well as step 406 above.

In step 410 of the matching rule construction method 400, a histogram model configures one or more computing hosts to take, as input, a tokenized n-gram, and a set of matched records, and output a histogram including discrete bins of counts of matched records according to file size.

One or more hosted applications of the security services can further provide a histogram model and a matching rule constructor. A histogram model, according to examples of the present disclosure, may include a set of computer-executable instructions that configure one or more processors of a computing system to take, as input, any tokenized n-gram, and a set of records of a threat database matched against the n-gram by a matching engine, and output a histogram in which counts of records matched against the n-gram are counted across discrete bins according to file size. For example, the histogram can be a 32-bin histogram according to examples of the present disclosure.

In step 412 of the matching rule construction method 400, a histogram aggregator configures one or more computing hosts to aggregate any number of histograms corresponding to respective n-grams into an aggregated histogram.

According to examples of the present disclosure, one or more hosted applications of the security services can further provide a histogram aggregator. A histogram aggregator, according to examples of the present disclosure, may include a set of computer-executable instructions that configure one or more processors of a computing system to take, as input, any number of histograms corresponding to respective n-grams, and aggregate each histogram into an aggregated histogram.

In a step 414 of the matching rule construction method 400, a histogram aggregator configures one or more computing hosts to determine at least a most frequent n-gram in each bin of the aggregated histogram.

For each bin of the aggregated histogram, the computing system can compare counts (of matching records) for each respective n-gram in that bin. The computing system can determine a most frequent n-gram for counts in each respective bin and can furthermore determine a least frequent n-gram for counts in each respective bin.

In a step 416 of the matching rule construction method 400, a matching rule constructor configures one or more computing hosts to construct a matching rule according to at least most frequent n-grams of each bin of the aggregated histogram.

According to examples of the present disclosure, one or more hosted applications of the security services can further provide a matching rule constructor. A matching rule constructor, according to examples of the present disclosure, may include a set of computer-executable instructions that configure one or more processors of a computing system to take, as input, a signature including at least a most frequent n-gram for counts in each respective bin of an aggregated histogram, and construct a matching rule according to the most frequent n-grams of the signature. By way of example, for a 32-bin aggregated histogram, the matching rule constructed in this fashion will include, as a signature, 32 n-grams found in the unidentified file sample which occur most frequently amongst records of the threat database across 32 discrete file size ranges. According to examples of the present disclosure, such a matching rule is subsequently referred to as a most statistically probable matching rule.

Furthermore, the computing system can be configured to additionally take, as input, a signature including at least a least frequent n-gram for counts in each respective bin of an aggregated histogram, and construct a matching rule according to the most frequent n-grams and the least frequent n-grams of the signature. By way of example, for a 32-bin aggregated histogram, the matching rule constructed in this fashion will include, as a signature, 32 n-grams found in the unidentified file sample which occur most frequently amongst records of the threat database across 32 discrete file size ranges, and another 32 n-grams found in the unidentified file sample which occur least frequently amongst records of the threat database across 32 discrete file size ranges. According to examples of the present disclosure, such a matching rule is subsequently referred to as a most statistically relevant matching rule, as it includes not only most statistically probable n-grams but also least statistically probable n-grams.

According to examples of the present disclosure, a most statistically probable matching rule and a most statistically relevant matching rule as described above both include at least those n-grams of an unidentified file sample which occur most frequently across samples of discrete ranges of file sizes. These most statistically probable n-grams are expected to match identified file samples on a comparatively generic basis, and thus can be appropriately uniquely identifying for unidentified file samples which are smaller in size, which may not yield sufficient tokenized n-grams to successfully match against identified file samples.

According to examples of the present disclosure, a most statistically relevant matching rule as described above further includes those n-grams of an unidentified file sample which occur least frequently across samples of discrete ranges of file sizes. In combination with those n-grams which occur most frequently, these most statistically relevant n-grams are expected to match identified file samples on a comparatively less generic basis, and thus can be appropriately uniquely identifying for unidentified file samples which are larger in size, which may yield too many tokenized n-grams which would successfully match against identified samples. Adding the least frequently occurring n-grams therefore filters out false positives.

In a step 418 of the matching rule construction method 400, the matching engine configures one or more computing hosts to search the threat database using a most statistically probable matching rule or a most statistically relevant matching rule.

The matching engine can configure a computing system to read into memory a most statistically probable matching rule or a most statistically relevant matching rule constructed as described above; to search records of a threat database using the most statistically probable matching rule or the most statistically relevant matching rule as a search parameter, causing any number of records of the threat database to be matched, where those records include identified file samples which match at least one of the one or more matching rules; and to return the matched records of the threat database. Thus, the above-mentioned hosted applications of a security service provide backend operation to a sample identification operation performed by a user operating a client computing device, in a fashion that does not require a user to manually discern strings from the unidentified file sample to derive a signature for the matching engine to search against the threat database.

Figure 5:
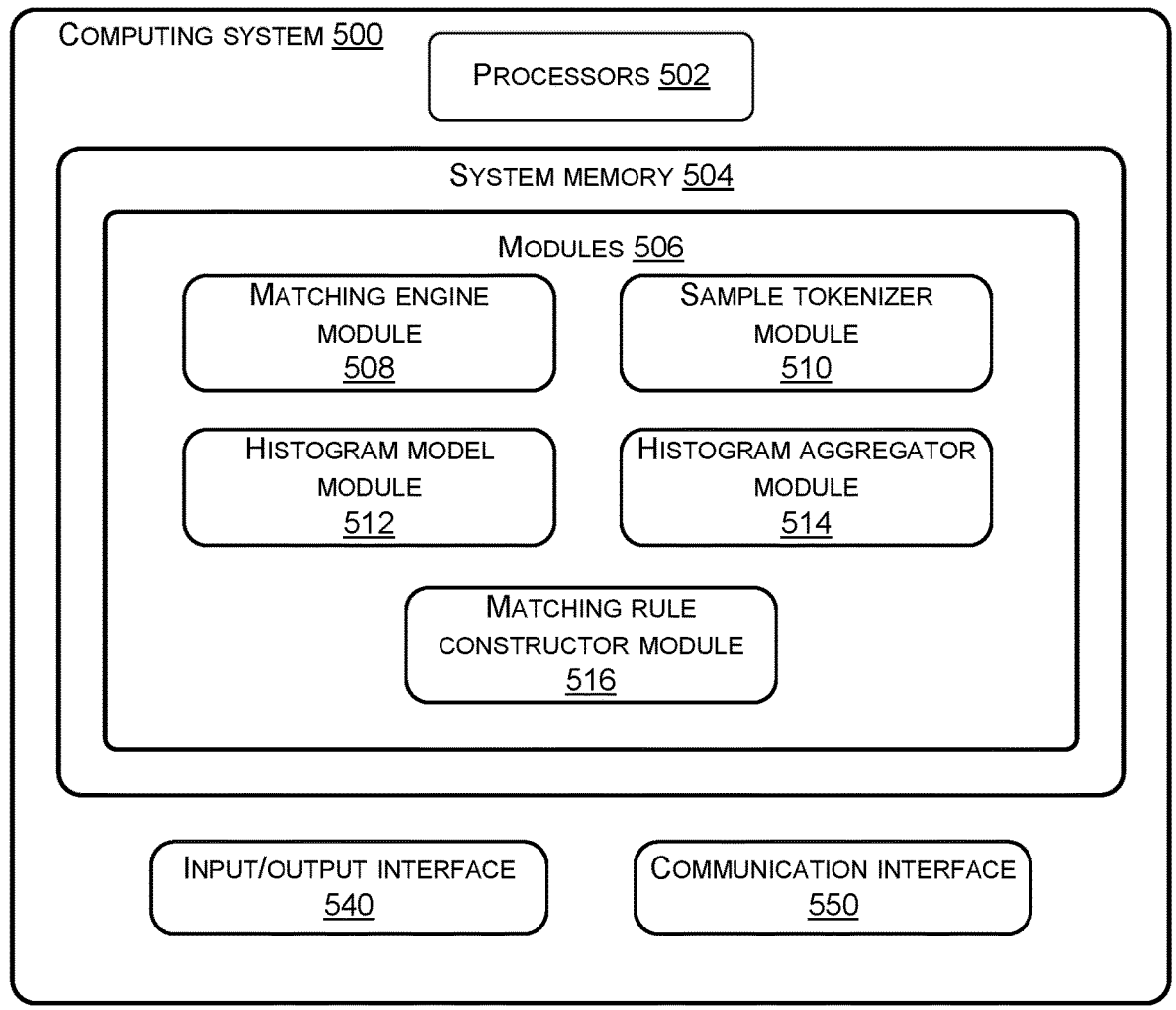
FIG. 5 illustrates an example computing system for implementing the processes and methods described herein for implementing a histogram model and a matching rule constructor.

FIG. 5 illustrates an example computing system 500 for implementing the processes and methods described above for implementing a histogram model and a matching rule constructor.

The techniques and mechanisms described herein may be implemented by multiple instances of the computing system 500, as well as by any other computing device, system, and/or environment. The computing system 500 may be a distributed system composed of multiple physically networked computers or web servers, a physical or virtual cluster, a computing cloud, or other networked computing architectures providing physical or virtual computing resources as known by persons skilled in the art. Examples thereof include computing hosts as described above with reference to FIG. 2 or FIG. 3. The computing system 500 shown in FIG. 5 is only one example of a system and is not intended to suggest any limitation as to the scope of use or functionality of any computing device utilized to perform the processes and/or procedures described above. Other well-known computing devices, systems, environments and/or configurations that may be suitable for use with the examples include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The computing system 500 may include one or more processors 502 and system memory 504 communicatively coupled to the processor(s) 502. The processor(s) 502 and system memory 504 may be physical or may be virtualized and/or distributed. The processor(s) 502 may execute one or more modules and/or processes to cause the processor(s) 502 to perform a variety of functions. Additionally, each of the processor(s) 502 may possess its own local memory, which also may store program modules, program data, and/or one or more operating systems.

Depending on the exact configuration and type of the computing system 500, the system memory 504 may be volatile, such as RAM, non-volatile, such as ROM, flash memory, miniature hard drive, memory card, and the like, or some combination thereof. The system memory 504 may include one or more computer-executable modules 506 that are executable by the processor(s) 502. The modules 506 may be hosted on a network as services for one or more security tools, which may be implemented on client computing devices separate from the computing system 500 as described above with reference to FIG. 3.

The modules 506 may include, but are not limited to, a matching engine module 508, a sample tokenizer module 510, a histogram model module 512, a histogram aggregator module 514, and a matching rule constructor module 516.

The matching engine module 508 may configure the computing system 500 to index identified file samples of a threat database, to search a threat database using a matching rule derived from a tokenized n-gram, and to search the threat database using a most statistically probable matching rule or a most statistically relevant matching rule as described above with reference to FIG. 4.

The sample tokenizer module 510 may configure the computing system 500 to tokenize an n-gram from the unidentified file sample according to parameter values for a value of n and a size of an interval as described above with reference to FIG. 4.

The histogram model module 512 may configure the computing system 500 to take, as input, a tokenized n-gram, and a set of matched records, and output a histogram including discrete bins of counts of matched records according to file size as described above with reference to FIG. 4.

The histogram aggregator module 514 may be configured to determine a most frequent n-gram in each bin of the aggregated histogram and a least frequent n-gram in each bin of the aggregated histogram with reference to FIG. 4.

The matching rule constructor module 516 may configure the computing system 500 to construct a matching rule according to most frequent n-grams of each bin of the aggregated histogram and least frequent n-grams of each bin of the aggregated histogram as described above with reference to FIG. 4.

The computing system 500 may additionally include an input/output (I/O) interface 540 and a communication module 550 allowing the system 500 to communicate with other systems and devices over a network, such as the data processing platform, a computing device of a data owner, and a computing device of a data collector. The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides a histogram model configuring a computing system to derive an indicator of compromise signature based on a sliding window index of identified malware samples, and a matching rule constructor configuring a computing system to generate matching signatures by selecting statistically relevant n-grams of an unidentified file sample. To generate tokenized n-grams as input for the histogram model, a sample tokenizer configures a computing system to tokenize an unidentified file sample (which can be represented as text or as hexadecimal) according to sliding window indexing. The histogram model configures a computing system to take each tokenized n-gram, and the set of matched records corresponding to that n-gram, as input to output a histogram discretizing a range of identified file samples from the set of matched records. The computing system is configured to repeat the above for each tokenized n-gram, thus deriving one histogram for each tokenized n-gram. A histogram aggregator configures the computing system aggregate the individual histograms, and determine a most frequent n-gram for counts in each respective bin and can determine a least frequent n-gram for counts in each respective bin. A matching rule constructor configures the computing system to construct a matching rule including, as a signature, 32 n-grams found in the unidentified file sample which occur most frequently amongst records of the threat database across 32 discrete file size ranges, and another 32 n-grams found in the unidentified file sample which occur least frequently amongst records of the threat database across 32 discrete file size ranges. The matching engine configures a computing system to search records of a threat database using the most statistically probable matching rule or the most statistically relevant matching rule as a search parameter. The above-mentioned aspects of the present disclosure provide backend operation to a sample identification operation performed by a user operating a client computing device, in a fashion that does not require a user to manually discern strings from the unidentified file sample to derive a signature for the matching engine to search against the threat database.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
searching a threat database using a matching rule derived from an n-gram from an unidentified file sample, returning a set of matched records;
outputting a histogram corresponding to the n-gram, the histogram comprising a plurality of bins each counting, for a respective file size range of a plurality of file size ranges, matched records of the threat database in that respective file size range;
aggregating a plurality of histograms corresponding to respective n-grams into an aggregated histogram; and
constructing a matching rule according to at least most frequent n-grams of each bin of the aggregated histogram.

2. The method of claim 1, wherein the n-gram is taken from the unidentified file sample according to parameter values for a value of n and a size of an interval.

3. The method of claim 1, wherein the threat database comprises identified file samples indexed by a sliding window index, the sliding window index comprising n-grams taken at intervals of bytes.

4. The method of claim 1, wherein the bins discretize identified file samples of matched records over exclusive subranges of file sizes.

5. The method of claim 1, wherein the matching rule comprises a signature, the signature comprising a plurality of n-grams of the unidentified file sample which occur most frequently amongst records of the threat database across a plurality of discrete file size ranges.

6. The method of claim 1, further comprising constructing the matching rule according to least frequent n-grams of each bin of the aggregated histogram.

7. The method of claim 6, wherein the matching rule comprises a signature, the signature comprising a plurality of n-grams of the unidentified file sample which occur least frequently amongst records of the threat database across a plurality of discrete file size ranges.

8. A system comprising:
one or more processors; and
memory communicatively coupled to the one or more processors, the memory storing computer-executable modules executable by the one or more processors that, when executed by the one or more processors, perform associated operations, the computer-executable modules comprising:
a matching engine module executable by the one or more processors to search a threat database using a matching rule derived from an n-gram from an unidentified file sample, returning a set of matched records;
a histogram model module executable by the one or more processors to output a histogram corresponding to the n-gram, the histogram comprising a plurality of bins each counting, for a respective file size range of a plurality of file size ranges, matched records of the threat database in that respective file size range;
a histogram aggregator module executable by the one or more processors to aggregate a plurality of histograms corresponding to respective n-grams into an aggregated histogram; and
a matching rule constructor module executable by the one or more processors to construct a matching rule according to at least most frequent n-grams of each bin of the aggregated histogram.

9. The system of claim 8, wherein the computer-executable modules further comprise a sample tokenizer executable by the one or more processors to take an n-gram from the unidentified file sample according to parameter values for a value of n and a size of an interval.

10. The system of claim 8, wherein the threat database comprises identified file samples indexed by a sliding window index, the sliding window index comprising n-grams taken at intervals of bytes.

11. The system of claim 8, wherein the bins discretize identified file samples of matched records over exclusive subranges of file sizes.

12. The system of claim 8, wherein the matching rule comprises a signature, the signature comprising a plurality of n-grams of the unidentified file sample which occur most frequently amongst records of the threat database across a plurality of discrete file size ranges.

13. The system of claim 8, wherein the matching rule constructor module is further executable by the one or more processors to construct the matching rule according to least frequent n-grams of each bin of the aggregated histogram.

14. The system of claim 13, wherein the matching rule comprises a signature, the signature comprising a plurality of n-grams of the unidentified file sample which occur least frequently amongst records of the threat database across a plurality of discrete file size ranges.

15. A non-transitory computer-readable storage medium storing computer-readable instructions executable by one or more processors, that when executed by the one or more processors, cause the one or more processors to perform operations comprising:
searching a threat database using a matching rule derived from an n-gram from an unidentified file sample, returning a set of matched records;
outputting a histogram corresponding to the n-gram, the histogram comprising a plurality of bins each counting, for a respective file size range of a plurality of file size ranges, matched records of the threat database in that respective file size range;
aggregating a plurality of histograms corresponding to respective n-grams into an aggregated histogram; and
constructing a matching rule according to at least most frequent n-grams of each bin of the aggregated histogram.

16. The non-transitory computer-readable storage medium of claim 15, wherein the n-gram is taken from the unidentified file sample according to parameter values for a value of n and a size of an interval.

17. The non-transitory computer-readable storage medium of claim 15, wherein the threat database comprises identified file samples indexed by a sliding window index, the sliding window index comprising n-grams taken at intervals of bytes.

18. The non-transitory computer-readable storage medium of claim 15, wherein the matching rule comprises a signature, the signature comprising a plurality of n-grams of the unidentified file sample which occur most frequently amongst records of the threat database across a plurality of discrete file size ranges.

19. The non-transitory computer-readable storage medium of claim 15, wherein the operations further comprise constructing the matching rule according to least frequent n-grams of each bin of the aggregated histogram.

20. The non-transitory computer-readable storage medium of claim 19, wherein the matching rule comprises a signature, the signature comprising a plurality of n-grams of the unidentified file sample which occur least frequently amongst records of the threat database across a plurality of discrete file size ranges.

* * * * *